(12) United States Patent
Ichinohe et al.

(10) Patent No.: US 6,716,946 B2
(45) Date of Patent: Apr. 6, 2004

(54) COATING

(75) Inventors: Shoji Ichinohe, Gunma-ken (JP); Shinji Miyadai, Gunma-ken (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 10/162,401

(22) Filed: Jun. 5, 2002

(65) Prior Publication Data
US 2003/0004269 A1 Jan. 2, 2003

(30) Foreign Application Priority Data
Jun. 5, 2001 (JP) ........................................ 2001-169418

(51) Int. Cl.7 ............................................... C08F 30/08
(52) U.S. Cl. ....................................... 526/279; 525/100
(58) Field of Search ............................ 526/279; 525/100

(56) References Cited
U.S. PATENT DOCUMENTS 4,343,927 A * 8/1982 Chang ......................... 526/262
4,693,935 A * 9/1987 Mazurek ....................... 428/352
5,866,630 A * 2/1999 Mitra et al. .................. 523/118

FOREIGN PATENT DOCUMENTS

| EP | 0 810 243 A1 | 12/1997 |
| EP | 0 989 168 A1 | 3/2000 |

* cited by examiner

Primary Examiner—Margaret G. Moore
(74) Attorney, Agent, or Firm—Birch, Stewart, Kolasch & Birch, LLP

(57) ABSTRACT

Coatings composed of (A) a copolymer prepared by copolymerizing (1) a silicone macromer having a double bond at one end of the molecule, (2) an unsaturated monomer having on the molecule both a carboxyl or acid anhydride group and a double bond, (3) an unsaturated silane monomer having on the molecule both a hydrolyzable silyl group and a double bond, (4) an unsaturated monomer having on the molecule both an amide, imide, carbamate or urea group and a double bond and, optionally, (5) another copolymerizable unsaturated monomer; in combination with (B) a crosslinking catalyst provide crosslinked coats which have an adhesion to substrates and a toughness comparable to isocyanate-crosslinked coats and which are also endowed with excellent lubricity.

5 Claims, No Drawings

COATING

BACKGROUND OF THE INVENTION

1. Field of the Invention

The present invention relates to acrylic silicone coatings.

2. Prior Art

Acrylic silicone coatings prepared by the solution polymerization of a silicon macromer having a double bond on one end of the molecule with an acrylic monomer are already known as materials which form high-lubricity coats when applied to a substrate. To enhance the strength and heat resistance of the applied coat, it is common practice to introduce a hydroxyl group onto the molecule by using a compound such as hydroxyethyl methacrylate as part of the acrylic monomer and to use an isocyanate to crosslink the resulting copolymer. However, environmental concerns in recent years have created a strong desire for safe crosslinking systems that can be used in place of isocyanate crosslinking.

The practice of copolymerizing a compound having both a hydrolyzable silyl group and a double bond with an acrylic monomer, then subjecting the resulting copolymer to silane crosslinking is also familiar to the art. Yet, when silane crosslinking is carried out on a silicone macromer-containing copolymer, coats formed from the resulting coating have improved heat resistance, but lack toughness. Moreover, although such coats have a good adhesion to inorganic substrates, their adhesion to organic substrates is inadequate. For these reasons, applied coats of a quality comparable to that of the above-described isocyanate-crosslinked copolymer coats have not previously been achieved.

A desire has thus been felt for the development of acrylic silicone coatings which provide coats having a lubricity, heat resistance, adhesion and toughness comparable with those of isocyanate-crosslinked copolymer coats.

SUMMARY OF THE INVENTION

It is therefore an object of the invention to provide acrylic silicone coatings which are capable of forming coats endowed with excellent lubricity, heat resistance, weatherability, pigment dispersibility, adhesion and toughness.

We have arrived at a useful copolymer by copolymerizing (1) a silicone macromer having a double bond at one end of the molecule, (2) an unsaturated monomer having on the molecule both a carboxyl or acid anhydride group and a double bond, (3) an unsaturated silane monomer having on the molecule both a hydrolyzable silyl group and a double bond, (4) an unsaturated monomer having on the molecule both an amide, imide, carbamate or urea group and a double bond and, optionally, (5) another copolymerizable unsaturated monomer. We have discovered in particular that adhesion to the substrate is improved by copolymerizing a carboxyl group-bearing monomer and that, when a monomer containing on the molecule both an amide, imide, carbamate or urea group and a double bond is copolymerized, the coat obtained after silane crosslinking is tough and is of a quality comparable to that of isocyanate-crosslinked copolymer coats.

Accordingly, the invention provides a coating composition comprising (A) a copolymer prepared by copolymerizing above constituents (1) to (4) and optional constituent (5), in combination with (B) a crosslinking catalyst.

DETAILED DESCRIPTION OF THE INVENTION

As noted above, a primary component of the inventive coating is a copolymer (resin) prepared by copolymerizing (1) a silicone macromer having a double bond at one end of the molecule, (2) an unsaturated monomer having on the molecule both a carboxyl or acid anhydride group and a double bond, (3) an unsaturated silane monomer having on the molecule both a hydrolyzable silyl group and a double bond, (4) an unsaturated monomer having on the molecule both an amide, imide, carbamate or urea group and a double bond and, optionally, (5) another copolymerizable unsaturated monomer.

Constituent (1) used in preparing the copolymer is a silicone macromer which has a double bond at one end of the molecule and preferably has the following structural formula.

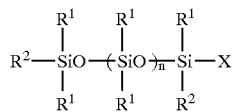

In the formula, $R^1$ is a monovalent hydrocarbon group of 1 to 8 carbons, such as an alkyl (e.g., methyl) or aryl (e.g., phenyl). Methyl is especially preferred. Like $R^1$, $R^2$ is also a monovalent hydrocarbon group of 1 to 8 carbons, although an alkyl group of 1 to 6 carbons is preferred. X is an organic group having an aliphatic unsaturated double bond, examples of which include acryloxypropyl, methacryloxypropyl and styryl groups. The letter n is a number from 3 to 300, and preferably from 20 to 200. If the letter n is too small, the coat obtained by applying the coating to a substrate has inadequate lubricity; on the other hand, if n is too large, the coat has diminished strength.

Such silicone macromers which include as a functional group a methacryl or methacryloylpropyl group and are thus suitable for use as constituent (1) are commercially sold and readily available.

Constituent (2) is an unsaturated monomer having on the molecule both a carboxyl or acid anhydride group and an aliphatic double bond. Illustrative examples include methacrylic acid, acrylic acid, (meth)acryloyloxyethylphthalic acid, (meth)acryloyloxyethylsuccinic acid, alkyl esters of maleic acid, alkyl esters of fumaric acid, maleic anhydride and fumaric anhydride. Of these, methacrylic acid is especially preferred for achieving good heat resistance because polymers thereof have the highest glass transition point.

Constituent (3) is an unsaturated silane monomer having on the molecule both a hydrolyzable silyl group and an aliphatic double bond. Preferred examples include vinyltrimethoxysilane, vinyltriethoxysilane, vinylmethyldimethoxysilane, vinylmethyldiethoxysilane, (meth)acryloxypropyltrimethoxysilane, (meth)acryloxypropyltriethoxysilane, (meth)acryloxypropylmethyldimethoxysilane, (meth)acryloxypropylmethyldiethoxysilane, styryltrimethoxysilane, styryltriethoxysilane, styrylmethyldimethoxysilane and styrylmethyldiethoxysilane.

Constituent (4) an unsaturated monomer having on the molecule both an amide, imide, carbamate or urea group and an aliphatic double bond. Illustrative examples include methyl (meth)acrylamide, ethyl (meth)acrylamide, propyl (meth)acrylamide, dimethyl (meth)acrylamide, diethyl (meth)acrylamide, dipropyl (meth)acrylamide, N-(meth)

acryloyloxyethyl-phthalimide, N-(meth)acryloyloxyethyl-succinimide, N-(meth)acryloyloxyethyl-hexahydrophthalimide, the reaction products of isocyanate ethyl methacrylate with a lower alcohol or phenol, and the reaction products of isocyanate ethyl methacrylate with an aliphatic or aromatic amine. A monomer having on the molecule both an imide group and an aliphatic double bond is especially preferred.

Optional constituent (5) may be any radical polymerizable monomer that is copolymerizable with above constituents (1) to (4). Suitable examples include methyl (meth)acrylate, ethyl (meth)acrylate, propyl (meth)acrylate, butyl (meth) acrylate, hexyl (meth)acrylate, 2-ethylhexyl (meth)acrylate, benzyl (meth)acrylate, isobornyl (meth)acrylate, hydroxyethyl (meth)acrylate, glycidyl (meth)acrylate and styrene.

The silicone macromer serving as constituent (1) is used to confer the applied coat with lubricity. It is used in an amount of preferably 5 to 50 parts by weight, and most preferably 10 to 30 parts by weight, per 100 parts by weight of the resin (copolymer) solids. At less than 5 parts by weight, the coat may have insufficient lubricity, whereas at more than 50 parts by weight, the coat strength may decline to an unacceptable level.

The unsaturated monomer having on the molecule both a carboxyl or acid anhydride group and a double bond that serves as constituent (2) is used to impart the resin with adhesive properties. In addition, it also has a pigment dispersibility enhancing effect. This unsaturated monomer is used in an amount of preferably 2 to 30 parts by weight, and most preferably 5 to 15 parts by weight, per 100 parts by weight of the resin solids. At less than 2 parts by weight, adhesion by the resin to substrates tends to be inadequate. On the other hand, at more than 30 parts by weight, phase separation with the silicone macromer tends to arise during polymerization. Methacrylic acid in particular, given the high glass transition temperature of homopolymers thereof, helps enhance the heat resistance of the applied coat.

The unsaturated silane monomer serving as constituent (3) is used to induce self crosslinking within the coat. It is included in an amount of preferably 1 to 20 parts by weight, and most preferably 2 to 10 parts by weight, per 100 parts by weight of the resin solids. At less than 1 part by weight, the crosslinkability tends to be inadequate. On the other hand, at more than 20 parts by weight, the high cost of the silane may give rise to disadvantages in terms of cost.

The unsaturated monomer having on the molecule both an amide, imide, carbamate or urea group and a double bond which serves as constituent (4) is used to confer the applied coat with flexibility and toughness. In isocyanate-crosslinked copolymer coats, the formation of carbamate groups after crosslinking has taken place contributes to the self-reinforcing properties of the coat. However, the inventive coating makes no use of isocyanate, and so the foregoing unsaturated monomer is used instead. This unsaturated monomer is included in an amount of preferably 10 to 50 parts by weight, and most preferably 15 to 40 parts by weight, per 100 parts by weight of the resin solids. At less than 5 parts by weight, the coat is often fragile and subject to crack formation. On the other hand, at more than 50 parts by weight, the applied coat generally has a lower hardness and poor lubricity.

The optional constituent (5) is used in an amount of preferably 0 to 60 parts by weight, and most preferably 20 to 50 parts by weight, per 100 parts by weight of the resin solids.

The copolymerization of above constituents (1) to (5) may be carried out by a known solution polymerization process.

The polymerization catalyst is typically a peroxide or azo compound. The solvent used during solution polymerization may be any suitable known solvent. However, to ensure the stability of the silane used in polymerization, it is preferable for all or part of the solvent to be a lower alcohol. Illustrative examples of other solvents that may be used together with such an alcohol include ketones such as acetone, methyl ethyl ketone and methyl isobutyl ketone, esters such as ethyl acetate and butyl acetate, aromatic solvents such as toluene and xylene, and aliphatic solvents such as hexane and heptane.

The inventive coating includes the above-described copolymer (A) and a catalyst (B) for crosslinking the copolymer. Advantageous use can be made of any known silane crosslinking catalyst, although it is especially preferable to use an organometallic compound of general formula (I)

a tetravalent organotin compound having one or two $C_{1-10}$ alkyl groups bonded to the same tin atom, or a partial hydrolyzate of either of these types of compounds.

In above formula (I), M is zirconium, titanium or aluminum; $R^3$ and $R^4$ are each independently a $C_{1-6}$ monovalent hydrocarbon group such as ethyl, n-propyl, i-propyl, n-butyl, sec-butyl, t-butyl, n-pentyl, n-hexyl, cyclohexyl and phenyl; $R^5$ is a $C_{1-6}$ monovalent hydrocarbon group similar to $R^3$ and $R^4$ or a $C_{1-16}$ alkoxy group such as methoxy, ethoxy, n-propoxy, i-propoxy, n-butoxy, sec-butoxy, t-butoxy, lauryloxy and stearyloxy; and the letters p and q are each integers from 0 to 4, p+q being the valence of M.

Illustrative examples of the organometallic compounds of formula (I) include:

(a) organozirconium compounds such as tetra-n-butoxyzirconium, tri-n-butoxy(ethyl acetoacetate) zirconium, di-n-butoxybis(ethyl acetoacetate) zirconium, n-butoxytris(ethyl acetoacetate) zirconium, tetrakis(n-propyl acetoacetate) zirconium, tetrakis (acetyl acetoacetate) zirconium and tetrakis(ethyl acetoacetate) zirconium;

(b) organotitanium compounds such as tetra-i-propoxytitanium, di-i-propoxybis(ethyl acetoacetate) titanium, di-i-propoxybis(acetyl acetate) titanium, di-i-propoxybis(acetylacetone) titanium; and (c) organoaluminum compounds such as tri-i-propoxyaluminum, di-i-propoxy(ethyl acetoacetate) aluminum, di-i-propoxy(acetyl acetonate) aluminum, i-propoxybis(ethyl acetoacetate) aluminum, i-propoxybis(acetyl acetonate) aluminum, tris(ethyl acetoacetate) aluminum, tris(acetyl acetonate) aluminum and monoacetyl acetonate bis(ethyl acetoacetate) aluminum.

Of these organometallic compounds (I) and their partial hydrolyzates, tri-n-butoxy(ethyl acetoacetate) zirconium, di-i-propoxybis(acetylacetonate) titanium, di-i-propoxy (ethyl acetoacetate) aluminum, tris(ethyl acetoacetate) aluminum, or partial hydrolyzates of these compounds are preferred.

Specific examples of organotin compounds that may be used as the crosslinking catalyst include carboxylic acid-type organotin compounds such as $(C_4H_9)_2Sn(OCOC_{11}H_{23})_2$, $(C_4H_9)_2Sn(OCOCH=CHCOOCH_3)_2$, $(C_4H_9)_2Sn(OCOCH=CHCOOC_4H_9)_2$, $(C_8H_{17})_2Sn(OCOC_8H_{17})_2$, $(C_8H_{17})_2Sn(OCOC_{11}H_{23})_2$, $(C_8H_{17})_2Sn(OCOCH=CHCOOCH_3)_2$, $(C_8H_{17})_2Sn$ $(OCOCH=CHCOOC_4H_9)_2$, $(C_8H_{17})_2Sn$
$(OCOCH=CHCOOC_8H_{17})_2$, $(C_8H_{17})_2Sn$
$(OCOCH=CHCOOC_{16}H_{33})_2$, $(C_8H_{17})_2Sn$
$(OCOCH=CHCOOC_{17}H_{35})_2$, $(C_8H_{17})_2Sn$
$(OCOCH=CHCOOC_{18}H_{37})_2$, $(C_8H_{17})_2Sn$
$(OCOCH=CHCOOC_{20}H_{41})_2$,

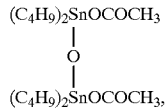

$(C_4H_9)Sn(OCOC_{11}H_{23})_3$ and $(C_4H_9)Sn(OCONa)_3$; mercaptide-type organotin compounds such as $(C_4H_9)_2Sn(SCH_2COOC_8H_{17})_2$, $(C_4H_9)_2Sn(SCH_2CH_2COOC_8H_{17})_2$, $(C_8H_{17})_2Sn(SCH_2COOC_8H_{17})_2$, $(C_8H_{17})_2Sn(SCH_2CH_2COOC_8H_{17})_2$, $(C_8H_{17})_2Sn(SCH_2COOC_{12}H_{26})_2$, $(C_8H_{17})_2Sn(SCH_2CH_2COOC_{12}H_{25})_2$, $(C_4H_9)Sn(SCOCH=CHCOOC_8H_{17})_3$, $(C_8H_{17})Sn(SCOCH=CHCOOC_8H_{17})_3$ and

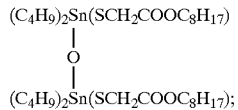

sulfide-type organotin compounds such as $(C_4H_9)_2Sn=S$, $(C_8H_{17})_2Sn=S$ and

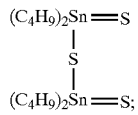

chloride-type organotin compounds such as $(C_4H_9)SnCl_3$, $(C_4H_9)_2SnCl_2$, $(C_8H_{17})_2SnCl_2$ and

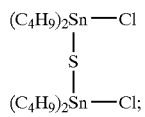

organotin oxides such as $(C_4H_9)_2SnO$ and $(C_8H_{17})_2SnO$; and the reaction products of these organotin oxides with ester compounds such as ethyl silicate, dimethyl maleate, diethyl maleate and dioctyl fumarate.

In the coatings of the invention, as described above, component A is prepared by ordinary solution polymerization. The inventive coating may be a single-liquid coating produced by adding the crosslinking catalyst to the polymer following solution polymerization. However, because such a coating has a short pot life, it is advantageous instead to add the catalyst to the copolymer shortly before the coating is to be applied to a substrate. The amount of catalyst added is preferably 0.1 to 1 part by weight per 100 parts by weight of the resin solids.

The coating thus obtained forms a coat having a lubricity, heat resistance, adhesion and toughness comparable to those of isocyanate-crosslinked copolymer coats, and also has an excellent pigment dispersibility. These qualities make the inventive coatings well suited for use in paint applications as a special vehicle for weather-resistant paints, antifouling paints, paints for preventing snow accumulation, and paints for preventing the affixing of posters; in release applications for the release of release paper, pressure-sensitive adhesive tape and stamping foil; in lubricating applications as back coatings for thermal transfer film and magnetic tape; and as protective surface coatings for magnetic cards, integrated circuit cards, magnetic tickets and heat-sensitive recording paper.

EXAMPLES

The following examples are provided to illustrate the invention, and are not intended to limit the scope thereof.

Synthesis Example 1

A liquid coating A was prepared by weighing out and adding to a flask 25 g of the silicone macromer of formula (i) below

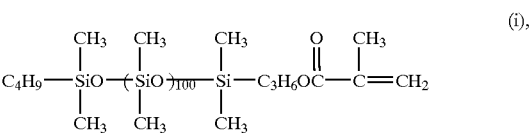

5 g of methacrylic acid, 5 g of methacryloxypropyltrimethoxysilane, 25 g of N-acryloyloxyethyl-hexahydrophthalimide of formula (ii) below

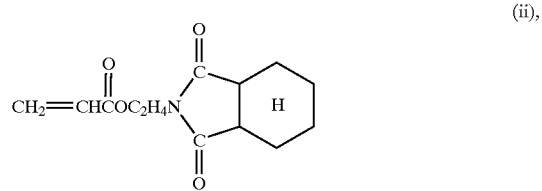

40 g of methyl methacrylate, 150 g of isopropyl alcohol as the solvent and 83 g of methyl ethyl ketone, then carrying out polymerization at 75° C. for 5 hours using 1 g of azobisisobutyronitrile as the polymerization catalyst.

Synthesis Example 2

A liquid coating B was prepared in the same way as in Synthesis Example 1, but using 25 g of dimethylacrylamide instead of the N-acryloyloxyethyl-hexahydrophthalimide used in Synthesis Example 1.

Synthesis Example 3

A liquid coating C was prepared in the same way as in Synthesis Example 1, but using 25 g of the equimolar reaction product of isocyanatoethyl methacrylate with ethanol instead of the N-acryloyloxyethyl-hexahydrophthalimide used in Synthesis Example 1.

Synthesis Example 4

A liquid coating D was prepared in the same way as in Synthesis Example 1, but using 25 g of the equimolar reaction product of isocyanatoethyl methacrylate with butylamine instead of the N-acryloyloxyethyl-hexahydrophthalimide used in Synthesis Example 1.

Comparative Example 1

A liquid coating E was prepared by weighing out and adding to a flask 25 g of the silicone macromer of formula (i) above, 15 g of hydroxyethyl methacrylate, 60 g of methyl methacrylate and 233 g of the solvent methyl ethyl ketone, then carrying out polymerization at 75° C. for 5 hours using 1 g of azobisisobutyronitrile as the polymerization catalyst.

Comparative Example 2

A liquid coating F was prepared by weighing out and adding to a flask 25 g of the silicone macromer of formula (i), 5 g of methacryloxypropyltrimethoxysilane, 25 g of N-acryloyloxyethyl-hexahydrophthalimide, 45 g of methyl methacrylate, and also 150 g of isopropyl alcohol and 83 g of methyl ethyl ketone as the solvents, then carrying out polymerization at 75° C. for 5 hours using 1 g of azobisisobutyronitrile as the polymerization catalyst.

Comparative Example 3

A liquid coating G was prepared by weighing out and adding to a flask 25 g of the silicone macromer of formula (i), 5 g of methacrylic acid, 5 g of methacryloxypropyltrimethoxysilane, 60 g of methyl methacrylate, and also 150 g of isopropyl alcohol and 83 g of methyl ethyl ketone as the solvents, then carrying out polymerization at 75° C. for 5 hours using 1 g of azobisisobutyronitrile as the polymerization catalyst.

Examples

Each of the resulting liquid coatings A, B, C, D, F and G was diluted to 5% with methyl ethyl ketone, following which 0.5 part by weight of dibutyltin dilaurate was added per 100 parts by weight of the resin solids to give the final liquid coating preparations A, B, C, D, F and G.

Liquid coating E was diluted to 5% with methyl ethyl ketone, following which 15 parts by weight (solids basis) of tolylene diisocyanate adduct was added to 100 parts by weight of the resin solids to give the final liquid coating preparation E.

The liquid coating preparations were applied onto one side of a 6 μm thick polyester film to a coat thickness when dry of 0.3 μm. The coat obtained after 48 hours of curing at 40° C. in the case of liquid coating preparation E, or after 24 hours of curing at room temperature in the case of the other liquid coating preparations, was then evaluated.

Adhesion was evaluated by a crosscut adhesion test in which cellophane tape was repeatedly attached to the applied coat and peeled off 25 times. If sections of the coat came off the substrate during the course of the test, an adhesion rating of "poor" was assigned.

In a toughness test, the coat was scratched with the edge of a 0.5 cm thick piece of glass. The toughness was rated as "good" when the degree of coat loss was about the same as in Comparative Example 3, and as "poor" when a greater degree of coat loss occurred.

Lubricity was measured by using a surface measurement apparatus (available from Shintoh kagaku Co., Ltd.) with a contact ball (stainless sphere having a diameter of 10 mm) in the condition of a load of 100 g and a moving rate of 250 mm/min.

The results are shown in Table 1 below.

TABLE 1

|  | Example | | | | Comparative Example | | Example |
| --- | --- | --- | --- | --- | --- | --- | --- |
|  | 1 | 2 | 3 | 4 | 1 | 2 | 1 |
| Liquid coating preparation | A | B | C | D | F | G | E |
| Adhesion | good | good | good | good | poor | good | good |
| Toughness | good | good | good | good | good | poor | good |
| Lubricity (μd) | 0.03 | 0.04 | 0.04 | 0.04 | 0.05 | 0.03 | 0.04 |

As is apparent from the foregoing results and the above description, the coatings of the invention provide crosslinked coats which have an adhesion to the substrate and a toughness comparable to those of isocyanate-crosslinked coats, and which are also endowed with excellent lubricity.

Japanese Patent Application No. 2001-169418 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A coating comprising (A) a copolymer and (B) a crosslinking catalyst, the copolymer A being prepared by copolymerizing:
   (1) 5 to 50 parts by weight of a silicone macromer having a double bond at one end of the molecule,
   (2) 2 to 30 parts by weight of an unsaturated monomer having on the molecule both a carboxyl or acid anhydride group and a double bond,
   (3) 1 to 20 parts by weight of an unsaturated silane monomer having on the molecule both a hydrolyzable silyl group and a double bond,
   (4) 10 to 50 parts by weight of an unsaturated monomer having on the molecule both an amide, imide, carbamate or urea group and a double bond and, optionally,
   (5) 0 to 60 parts by weight of another copolymerizable unsaturated monomer,
   based on a total of 100 parts by weight of constituents (1) to (5); and
   the coating including 0.1 to 1 part by weight of component B per 100 parts by weight of component A.

2. The coating of claim 1, wherein constituent (4) is an unsaturated monomer having on the molecule both an imide group and a double bond.

3. The coating of claim 1 wherein the silicone macromer (1) has the following structural formula:

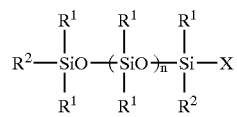

wherein $R^1$ is a monovalent hydrocarbon group of 1 to 8 carbons, $R^2$ is a monovalent hydrocarbon group of 1 to 8 carbons, X is an organic group having an aliphatic unsaturated double bond, and letter n is a number from 3 to 300.

4. The coating of claim 1 or 2 wherein the unsaturated monomer having on the molecule both a carboxyl or acid anhydride group and an aliphatic double bond (2) is selected from the group consisting of methacrylic acid, acrylic acid, (meth)acryloyloxyethylphthalic acid, (meth)acryloyloxyethylsuccinic acid, alkyl esters of maleic acid, alkyl esters, of fumaric acid, maleic anhydride and fumaric anhydride, the unsaturated silane monomer having on the molecule both a hydrolyzable silyl group and an aliphatic double bond (3) is selected from the group consisting of vinyltrimethoxysilane, vinyltriethoxysilane, vinylmethyldimethoxysilane, vinylmethyldiethoxysilane, (meth)acryloxypropyltrimethoxysilane, (meth)acryloxypropyltriethoxysilane, (meth)acryloxypropylmethyldimethoxysilane, (meth)acryloxypropylmethyldiethoxysilane, styryltrimethoxysilane, styryltriethoxysilane, styrylmethyldimethoxysilane and styrylmethyldiethoxysilane, and the unsaturated monomer having on the molecule both an amide, imide, carbamate or urea group and an aliphatic double bond (4) is selected from the group consisting of methyl (meth)acrylamide, ethyl (meth)acrylamide, propyl (meth)acrylamide, dimethyl (meth)acrylamide, diethyl (meth)acrylamide, dipropyl (meth)acrylamide, N-(meth)acryloyloxyethyl-phthalimide, N-(meth)acryloyloxyethyl-succinimide, N-(meth)acryloyloxyethyl-hexahydrophthalimide, the reaction products of isocyanate ethyl methacrylate with a lower alcohol or phenol, and the reaction products of isocyanate ethyl methacrylate with an aliphatic or aromatic amine.

5. The coating of claim 1 wherein the crosslinking catalyst (B) is selected from the group consisting of organometallic compounds of the following formula (I):

wherein M is zirconium, titanium or aluminum, $R^3$ and $R^4$ are each independently a $C_{1-6}$ monovalent hydrocarbon group, $R^5$ is a $C_{1-6}$ monovalent hydrocarbon group or a $C_{1-6}$ alkoxy group, and letters p and q are each integers from 0 to 4, p+q being the valence of M, tetravalent organotin compounds having one or two $C_{1-10}$ alkyl groups bonded to the same tin atom, or partial hydrolyzates of either of these types of compounds.

* * * * *